United States Patent [19]
Karisch et al.

[11] Patent Number: 5,385,048
[45] Date of Patent: Jan. 31, 1995

[54] ACCELERATION SENSOR

[75] Inventors: Tilo Karisch, Frankfurt am Main; Wolfgang Porth, Frankfurt/M., both of Germany

[73] Assignee: VDO Adolf Schindling AG, Frankfurt, Germany

[21] Appl. No.: 77,157

[22] Filed: Jun. 14, 1993

Related U.S. Application Data

[62] Division of Ser. No. 766,582, Sep. 27, 1991, abandoned.

[30] Foreign Application Priority Data

Oct. 14, 1990 [DE] Germany ............... 4033766
Oct. 24, 1990 [DE] Germany ............... 4033765

[51] Int. Cl.⁶ .......................................... G01P 15/08
[52] U.S. Cl. ............................. 73/517 R; 73/517 B
[58] Field of Search ............. 73/517 R, 517 B, 653; 250/231.1; 367/99

[56] References Cited

U.S. PATENT DOCUMENTS

| | | | |
|---|---|---|---|
| 3,140,612 | 7/1964 | Houghton et al. | 73/517 R |
| 3,151,487 | 10/1964 | Schuck | 73/517 R |
| 4,244,226 | 1/1981 | Green et al. | 367/99 |
| 4,553,436 | 11/1985 | Hansson | 73/517 R |
| 4,815,321 | 3/1989 | Malvern | 73/517 R |
| 4,819,486 | 4/1989 | Kunkel et al. | 73/517 R |
| 5,048,319 | 9/1991 | Neuhaus | 73/517 B |
| 5,050,435 | 9/1991 | Pinson | 73/517 B |

FOREIGN PATENT DOCUMENTS 3538766  5/1987  Germany .

*Primary Examiner*—John E. Chapman
*Attorney, Agent, or Firm*—Martin A. Farber

[57] ABSTRACT

A sensor for measuring accelerations has a small plate 1 which is arranged in a housing 3 perpendicular to a direction of measurement 11, and is clamped at its edges with the interposition of flexural soft regions 2. There is, furthermore, provided a transmitter-receiver unit 4a, 4b which is so arranged in the housing 3 on a path compensator 12 that rays coming from the transmitter 4a are reflected by the small plate 1 onto the receiver 4b. Thereby an electrical signal is formed which serves to control the voltage 13A outputted by the path compensator 12. In a further embodiment of the invention, there are two transmitter-receiver units which are so arranged in a housing 23 that the rays coming from the transmitters 24a are reflected by the front and back of the small plate 1 onto the receivers 24b.

13 Claims, 2 Drawing Sheets

ACCELERATION SENSOR

RELATED APPLICATION

This application is a division of our co-pending application Ser. No. 07/766,582 filed Sep. 27, 1991 now abandoned.

FIELD AND BACKGROUND OF THE INVENTION

The present invention relates to a sensor for the measurement of accelerations having a substantially one-dimensionally deflectable mass part which is spring mounted in a housing and a distance measurement device with transmitter and receiver which operates without contact.

Such sensors are employed in motor vehicles for producing a signal for triggering an air bag, for activating a belt-tightening system, or for detecting acceleration values for control of a running gear. They must be operable without limitation over a wide range of temperatures and must not lose their reliability in operation for a long period of time. Furthermore, they should be as simple and inexpensive as possible.

A sensor for the above-mentioned field of use is known from German OS 35 38 766. The sensor element is developed in the form of a flexural oscillator with or without additional mass coupling, the acceleration-induced mechanical deformation of which is detected by a distance measurement method which operates without contact and is delivered as electrical signal. In this connection, two sensors are arranged in such a manner that the sum of their output signals corresponds to twice the linear acceleration and their difference is a measure of a rotary acceleration.

This known acceleration sensor has the disadvantage that a non-linear signal is obtained with which it is not possible to determine whether, in the case of a difference in signals, a rotational acceleration is present, or whether an age-induced change in the sensor data or in mechanical construction has occurred. Furthermore, two highly accurate sensors are required for detection of a distance requiring sensors to detect an entire range of deflection of a flexural oscillator. The setting of the zero points for both sensors is very difficult.

SUMMARY OF THE INVENTION

It is thus an object to propose a sensor which does not have the disadvantages described above and which satisfies all of above-indicated requirements.

According to the invention, a mass component consists of a small reflecting plate (1) which is perpendicular to the direction of measurement, and a transmitter and receiving unit (4a–4b)) is so arranged in the housing (3), on a path compensator (12), that rays coming from the transmitter (4a) are reflected by the small plate (1) onto the receiver (4b).

The sensor satisfies all conditions required of it, and it has the additional advantage that it can be produced at relatively little expense. The acceleration-induced changes in the distance between the small plate and the base for the transmitter-receiver unit are detected, converted into electrical signals, and used to control the path compensator. Changes in distance are compensated, and a signal which corresponds to an expenditure required for this is formed and directed by the sensor towards the outside for further utilization. Zero balancing and a temperature compensation can be effected with very little expense. Close tolerances are made on the quality of the distance detection only in the region close to the balanced condition (zero point detection).

According to a feature of the invention, a piezoelectric path setter is used as path compensator (12).

According to another feature, an electrodynamic path setter is used as path compensator (12).

Still further, an electrostatic path setter is used as path compensator (12).

Also by the invention, the small plate (1) is developed as central part (8) of an edge-clamped diaphragm (5) which is flexurally soft in the direction of measurement.

Another feature of the invention provides that the small plate (1) consists of a diaphragm (5) with a flexurally stiff central part (8) wherein the diaphragm (5) is made flexurally soft by slits (6) in a region between small plate (1) and edge (9).

Still further, the small plate (1) consists of a flexurally stiff central part (8) of the diaphragm (5) which is made flexurally soft by a smaller thickness of material in a region between small plate (1) and edge (9) of the diaphragm.

Also the invention provides that the small plate (1) is formed of a flexurally stiff mass coating on an edge-clamped diaphragm (5) of resilient or elastic material.

Still according to another feature of the invention, the transmitter-receiver unit consists of a light-emitting component (4a) in the form of a light-emitting diode or laser diode, and of a light-sensitive component (4b) for the conversion of optical signals into electrical signals in the form of a phototransistor, photoresistor or a photodiode.

The invention provides that an ordinary optical distance-measuring instrument is used as a transmitter-receiver unit.

Also by the invention the transmitter-receiver unit may comprise a sound-emitting component (4a) in the form of a piezo-ultrasonic transmitter, and a sound-sensitive component (4b) for the conversion of acoustic signals into electrical signals in the form of a microphone.

According to another feature, the transmitter-receiver unit comprises an ordinary ultrasonic distance-measuring instrument.

Furthermore, the transmitter-receiver unit may comprise an ordinary distance sensor.

In an alternative embodiment having plural transmitters and plural receivers, the invention provides that the mass part consist of a small reflecting plate (1) arranged perpendicular to a direction of measurement and that two transmitter-receiver units (24a–24b) be arranged in the housing (23) in such a manner that the rays proceeding from transmitters (24a) are reflected by the front and back of the plate (1) onto corresponding receivers (24b). Furthermore, as a result of the double distance measurement with reversed sign, it is, on the one hand, very easy to effect a zero balancing of the sensor and, on the other hand, an output signal is produced which corresponds to double the deflection of the mass part. The arrangement selected also makes an independent temperature correction possible as well as recalibration, with the proviso that the sum of the two signals must remain constant.

BRIEF DESCRIPTION OF THE DRAWING

With the above and other objects and advantages in view, the present invention will become more clearly understood in connection with the detailed description of preferred embodiments, when considered with the accompanying drawing, of which:

FIGS. 1A and 1B show modifications of the sensor of FIG. 1 wherein

FIG. 1A shows a sensor employing an electrostatic unit, and

FIG. 1B shows a sensor employing an electrodynamic unit;

DETAILED DESCRIPTION OF THE PREFERRED EMBODIMENTS

Figure 1:
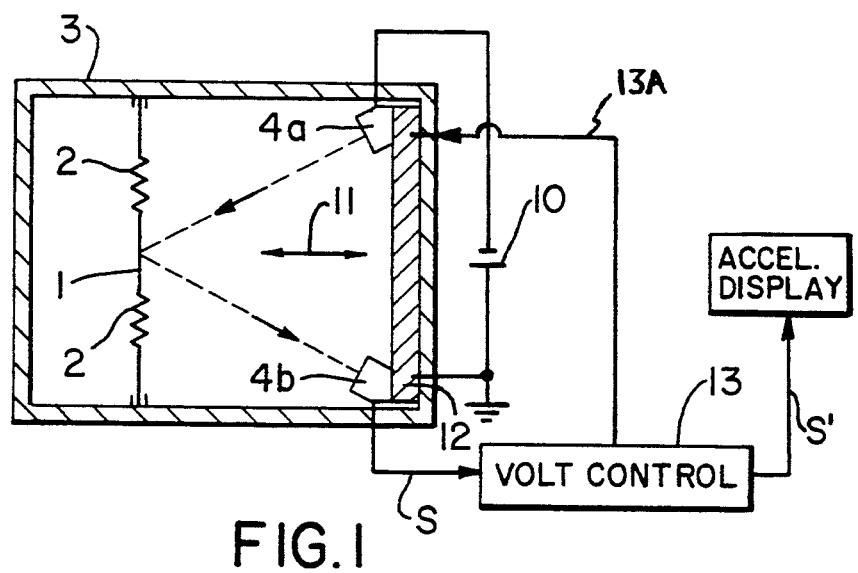
FIG. 1 shows a sensor according to the invention in cross-section, and partially in diagrammatic view having one transmitter and one receiver, the sensor employing a piezoelectric unit.

FIG. 1 shows an embodiment of the inventive concept in greatly simplified form. In a housing 3, a small plate 1 is clamped on its edges with the interposition of flexurally soft regions 2. There is provided a transmitter-receiver unit which is so arranged on a path compensator 12 that rays coming from a transmitter 4a are reflected by the small plate 1 onto a receiver 4b. 11 indicates the direction in which the sensor can measure accelerations. Only those portions of differently directed accelerations, portions which fall in the direction of the arrows 11, are detected. The transmitter 4a is supplied with energy by a source of voltage. Receiver 4b generates a signal S corresponding to the change of distance between the surface of path compensator 12, on which the transmitter 4a and the receiver 4b are fastened, and the small plate 1 which is moved along arrow 11 when the sensor is accelerated. The signal S is used by the control device 13 to control a voltage 13A applied to the path compensator 12 to alter its position according to the applied voltage 13A, and thereby keeps the distance between plate 1 and surface of path compensator 12 constant. S' is a signal outputted by the control device 13 in correspondence with the effort necessary to accomplish the foregoing distance changes, and can be displayed or recorded as a signal representing the acceleration by which the plate is moved.

Figure 1A:
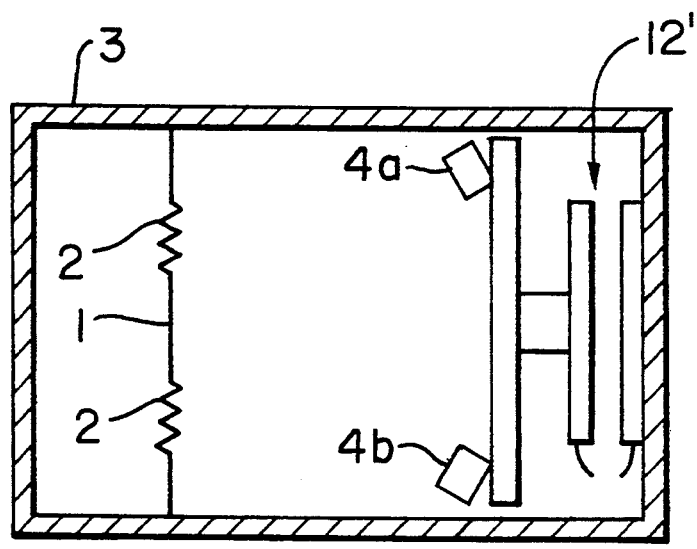
Figure 1B:
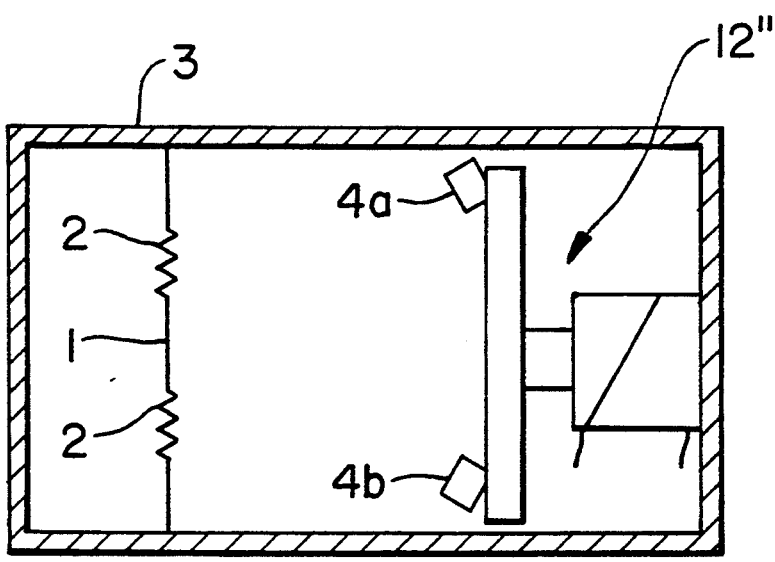

The path compensator 12 and FIG. 1 is a piezoelectric unit. By way of alternative embodiments of the invention, an electrostatic path compensator 12' is shown in FIG. 1A, and an electrodynamic path compensator 12" is shown in FIG. 1B.

Figure 2:
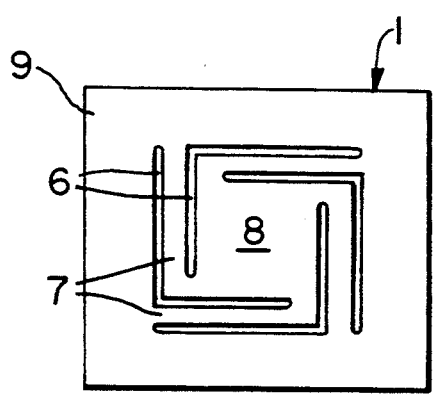
FIG. 2 shows a first embodiment of the mass part.

FIG. 2 shows a membrane or diaphragm 5 in which slits 6 are formed, and webs 7 are developed and connect the centrally arranged small plate 1 in flexurally soft manner to the edge 9.

Figure 3:
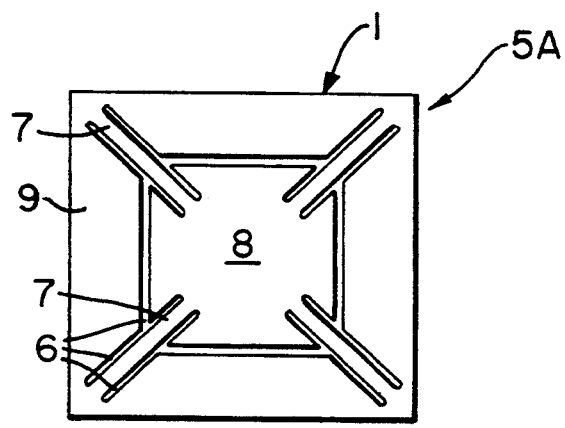
FIG. 3 shows a second embodiment of the mass part.

The diaphragm 5A of FIG. 3 differs from that shown by FIG. 2 only by a different alignment of the slits 6 and a different arrangement of the webs 7.

Figure 4:
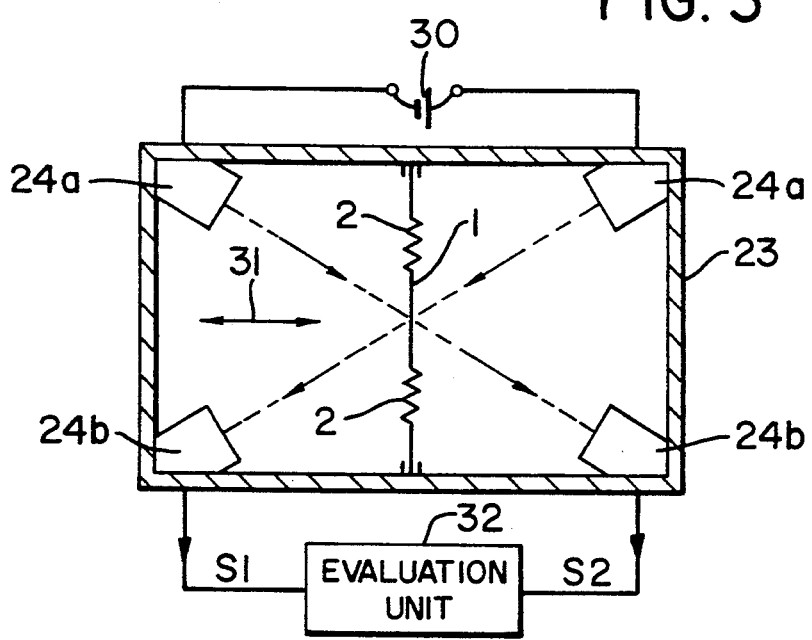
FIG. 4 shows, diagrammatically, a sensor having two transmitters and two receivers according to a further embodiment of the invention.

FIG. 4 shows an embodiment of the inventive concept in greatly simplified form. In a housing 23 a small plate 1 is clamped on its edges with the interposition of flexurally soft regions 2. There are furthermore provided two transmitters 24a and two receivers 24b which are so arranged in the housing 23 that the rays coming from the transmitters 24a are reflected by front and back surfaces of the small plate 1 onto the receivers 24b. 31 is the direction in which the sensor can measure accelerations. Of the differently directed accelerations, only the portion of the acceleration forces incident in the direction indicated by the arrows 31 are detected. The transmitters 24a are supplied with energy by a source of voltage 30 while the electrical signals of the left and right transmitter-receiver units, which correspond to the acceleration in question, are fed to an evaluation unit 32 via connections S1 and S2, respectively.

We claim:

1. A sensor for measurement of accelerations comprising
   a housing and a substantially one-dimensionally deflectable mass component spring mounted in the housing;
   a distance measurement device with a transmitter and a receiver which operate in contactless fashion;
   a path compensator;
   wherein the mass component comprises a reflecting plate which is perpendicular to a direction of measurement; and
   the transmitter and the receiver are located in the housing upon the path compensator to enable rays coming from the transmitter to be reflected by the plate onto the receiver.

2. A sensor according to claim 1, wherein said path compensator comprises a piezoelectric unit.

3. A sensor according to claim 1, wherein said path compensator comprises an electrodynamic unit.

4. A sensor according to claim 1, wherein said path compensator comprises an electrostatic unit.

5. A sensor according to claim 1, wherein
   the sensor comprises a diaphragm; and
   said plate comprises a central part of the diaphragm, the diaphragm being edge clamped and flexurally soft in the direction of measurement.

6. A sensor according to claim 5, wherein said plate comprises a flexurally stiff central part of said diaphragm which is made flexurally soft by slits in a region between said plate and an edge of said diaphragm.

7. A sensor according to claim 5, wherein
   said plate comprises a flexurally stiff central part of said diaphragm made flexurally soft by a smaller thickness of material in a region between said plate and an edge of said diaphragm.

8. A sensor according to claim 5, wherein
   said plate comprises a flexurally stiff mass coating located on said diaphragm and being of resilient material.

9. A sensor according to claim 1, wherein
   said transmitter comprises a light-emitting component comprising a light-emitting diode or laser diode, and said receiver comprises a light-sensitive component for the conversion of optical signals into electrical signals, said light-sensitive component comprising a phototransistor, a photoresistor or a photodiode.

10. A sensor according to claim 1, wherein
    said distance measurement device is an optical distance-measuring instrument.

11. A sensor according to claim 10, wherein said transmitter comprises a sound-emitting component comprising a piezo-ultrasonic transmitter, and
    said receiver comprises a sound-sensitive transducer for the conversion of acoustic signals into electrical signals, said sound-sensitive transducer being a microphone.

12. A sensor according to claim 1, wherein said distance measurement device is an ultrasonic distance-measuring instrument.

13. A sensor according to claim 1, wherein said path compensator extends parallel to said reflecting plate, and is spaced apart therefrom in the direction of measurement, the sensor further comprising a control device to maintain a constant distance between the compensator and the reflecting plate.

* * * * *